UNITED STATES PATENT OFFICE.

ALPHONSE EXBRAYAT, OF LEVALLOIS, FRANCE.

MANUFACTURE OF BRIQUETS.

No. 849,058.     Specification of Letters Patent.     Patented April 2, 1907.

Application filed October 26, 1905. Renewed March 7, 1907. Serial No. 361,147.

*To all whom it may concern:*

Be it known that I, ALPHONSE EXBRAYAT, chemist, a citizen of the French Republic, and a resident of Levallois, France, have invented new and useful Improvements in the Manufacture of Briquets, of which the following is a specification.

This invention relates to improvements in the manufacture of briquets from coal-dust, and more particularly to the preparation of the binding material.

According to this invention the dust from coals of any kind—such as dust from coke, mineral coal, charcoal, graphite, and the like—is bound with a paste obtained by the transformation of seaweed or lichens into a gelatinous material, which, admixed with the coaldust, binds the same so that solid briquets can be formed.

The binding material is obtained by treating the seaweed or lichens with hot or cold water or steam in any suitable vessel in admixing sodium oxid until they form a pulpy material. Although any suitable apparatus may be used, it is preferable to use a vacuum steam-boiling apparatus to preserve as much as possible the gluing properties of the material. To this gelatinous pulp a small quantity of rosin is added, which is intimately admixed with the pulp, which for this purpose is slightly heated. The coal-dust is then mixed with a suitable quantity of the glutinous material in any of the known mixing apparatuses, after which the briquets are formed in the well-known manner, which are dried afterward. The thus-obtained agglomerated coal is of at least the same hardness and possesses at least the same caloric properties as ordinary coal.

The hereinbefore-described method of manufacture may be modified as follows: It may be advantageous in some cases to replace the rosin by lime or lime salts or cement for better absorbing the moisture contained in the glutinous pulp of seaweed or lichens. In this case the hardening of the briquets is obtained by addition of formic aldehyde or alkaline ferric hydrate admixed with alkaline silicates, which admixtion effectively prevents the dissolving of the briquets in water. The glutinous pulp of seaweed or lichens has to be moist to a certain degree if it is properly to be mixed with the coal-dust. The addition of lime, lime salts, or cement is not absolutely necessary, but may be advantageous under certain conditions. The formic aldehyde or alkaline ferric hydrate is added to the gelatinous pulp before the same is used for forming the briquets. The oxidation of the gelatinous pulp by the ozone at the contact with the water and by the nitrogen of the pulp causes the formation of nitric acid, which combines with the alkaline salts and forms sodium nitrate or potassium nitrate, which accelerate the combustion of the fuel in considerably increasing its calorific power and in absorbing entirely the small quantity of smoke which may be produced. If, however, one wants to obtain a less vivid combustion, a certain quantity of aluminium silicates must be added.

What I claim as my invention, and desire to secure by Letters Patent, is—

1. Method for the manufacture of an adhesive to be used for the manufacture of briquets, according to which the adhesive is made by boiling seaweed with water to transform it into a gelatinous pulp, by adding sodium oxid to the pulp, and by admixing lime, lime salts or cement and a composition of formic aldehyde and alkaline silicates after the pulp has been prepared, substantially as described and for the purpose set forth.

2. Method for the manufacture of an adhesive to be used for the manufacture of briquets, according to which the adhesive is made by boiling lichens with water to transform it into a gelatinous pulp, by adding sodium oxid to the pulp, and by admixing lime, lime salts or cement and a composition of formic aldehyde and alkaline silicates after the pulp has been prepared, substantially as described and for the purpose set forth.

In witness whereof I have hereunto set my hand in presence of two witnesses.

ALPHONSE EXBRAYAT.

Witnesses:
    JEAN BONNICART,
    HANSON C. COXE.